United States Patent
Kojima et al.

(10) Patent No.: US 7,295,420 B2
(45) Date of Patent: Nov. 13, 2007

(54) MULTILAYER ELECTRONIC COMPONENT AND MANUFACTURING METHOD THEREOF

(75) Inventors: Tatsuya Kojima, Tokyo (JP); Kaname Ueda, Tokyo (JP); Toru Tonogai, Tokyo (JP); Raitaro Masaoka, Tokyo (JP); Akinori Iwasaki, Minamiashigara (JP); Akira Yamaguchi, Tokyo (JP); Shogo Murosawa, Tokyo (JP)

(73) Assignee: TDK Corporation, Tokyo (JP)

( * ) Notice: Subject to any disclaimer, the term of this patent is extended or adjusted under 35 U.S.C. 154(b) by 106 days.

(21) Appl. No.: 11/346,288

(22) Filed: Feb. 3, 2006

(65) Prior Publication Data
US 2006/0214263 A1 Sep. 28, 2006

(30) Foreign Application Priority Data
Mar. 28, 2005 (JP) .............................. 2005-093073

(51) Int. Cl.
*H01G 4/228* (2006.01)
(52) U.S. Cl. .................. 361/306.3; 361/306.1; 361/321.1; 361/321.2; 361/311; 361/313
(58) Field of Classification Search ........... 361/306.3, 361/306.1, 306.2, 321.1, 321.2, 321.4, 321.5, 361/311–313, 301.2, 301.4; 257/294, 295
See application file for complete search history.

(56) References Cited

U.S. PATENT DOCUMENTS

| | | | | |
|---|---|---|---|---|
| 5,157,576 A | * | 10/1992 | Takaya et al. ............ 361/321.2 |
| 5,739,742 A | * | 4/1998 | Iga et al. .................... 338/21 |
| 5,835,338 A | * | 11/1998 | Suzuki et al. ............ 361/301.4 |
| 5,870,273 A | * | 2/1999 | Sogabe et al. ............ 361/306.3 |
| 6,052,272 A | * | 4/2000 | Kuroda et al. .............. 361/303 |
| 6,108,191 A | * | 8/2000 | Bruchhaus et al. ...... 361/306.3 |
| 6,606,237 B1 | * | 8/2003 | Naito et al. .............. 361/306.3 |
| 6,879,481 B2 | * | 4/2005 | Honda et al. ................ 361/311 |

FOREIGN PATENT DOCUMENTS

| | | |
|---|---|---|
| JP | 2001-76958 | 3/2001 |
| JP | 2001-358036 | 12/2001 |
| JP | 2004-269325 | 9/2004 |

OTHER PUBLICATIONS

U.S. Appl. No. 11/346,288, filed Feb. 3, 2006, Kojima et al.
U.S. Appl. No. 11/374,041, filed Mar. 14, 2006, Tonogai et al.
U.S. Appl. No. 11/406,352, filed Apr. 19, 2006, Kojima.

* cited by examiner

*Primary Examiner*—Nguyen T. Ha
(74) *Attorney, Agent, or Firm*—Oblon, Spivak, McClelland, Maier & Neustadt, P.C.

(57) ABSTRACT

Internal electrode layers are superimposed in a dielectric substrate 1 at intervals. Step absorption layers are respectively provided on lateral sides of the internal electrode layers. A side portion of the internal electrode layer forms an inclined surface, and the step absorption layer is superimposed so as to partially overlap the inclined surface of the internal electrode layer. This is also applied to the other internal electrode layers and step absorption layers.

6 Claims, 5 Drawing Sheets

MULTILAYER ELECTRONIC COMPONENT AND MANUFACTURING METHOD THEREOF

BACKGROUND OF THE INVENTION

1. Field of the Invention

The present invention relates to a multilayer electronic component and a manufacturing method thereof.

2. Description of the Related Art

In general, a multilayer electronic component such as a multilayer ceramic capacitor is made of a sheet laminated body formed by superimposing a plurality of ceramic green sheets each including an internal electrode.

In such a multilayer electronic component, a step generated with respect to another part due to a thickness of the internal electrode cannot be ignored as the number of laminated layers is increased. That is, a step due to presence/absence of the internal electrode is produced between a lamination region including a margin portion on which the internal electrode is not printed and a lamination region including the internal electrode. Such a step induces a crack or delamination at the time of baking, which can be a factor of deteriorating characteristics of a product or reducing a process yield. Thus, there is known a technology which prints a ceramic paste around an internal electrode to form a step absorption layer, thereby eliminating the problem of the step (see Patent Reference 1: Japanese Patent Application Laid-open No. 2001-358036).

However, at a ceramic paste print step, there actually occurs displacement, expansion/contraction or the like of a print pattern. Therefore, as shown in FIG. 4 of Patent Reference 2 (Japanese Patent Application Laid-open No. 2001-76958), a step absorption layer gets onto an upper surface of an internal electrode or a gap is generated between the step absorption layer and the internal electrode.

In regard to this problem, the technology described in Patent Reference 2 sequentially shifts a print position of the step absorption layer by a predetermined distance in a predetermined direction in accordance with each ceramic green sheet to avoid a concentration of pattern misalignment on a specific position.

However, the technology described in Patent Reference 2 requires control or management of a print shift quantity, thus resulting in complicated manufacturing steps.

Further, FIG. 1 of Patent Reference 3 (Japanese Patent Application Laid-open No. 2004-269325) discloses a configuration in which an internal electrode on a ceramic green sheet has a shape having an inclined surface as seen from a lamination direction and a step absorption layer is superimposed and formed on the entire inclined surface of the internal electrode.

However, in this configuration, when displacement or expansion of a print pattern is generated when printing the step absorption layer, the step absorption layer gets onto an upper surface of the internal electrode. When the step absorption layer gets onto the upper surface of the internal electrode, a problem of delamination occurs.

SUMMARY OF THE INVENTION

It is an object of the present invention to provide a multilayer electronic component and a manufacturing method thereof which can readily prevent a step absorption layer from getting onto an upper surface of an internal electrode or prevent a gap from being generated between the step absorption layer and the internal electrode.

<Multilayer Electronic Component>

To attain this object, according to the present invention, there is provided a multilayer electronic component comprising: a dielectric substrate; a plurality of internal electrode layers superimposed in the dielectric substrate at intervals; and step absorption layers provided on lateral sides of the internal electrode layers.

A side portion of at least one internal electrode layer forms an inclined surface. Furthermore, at least one step absorption layer is superimposed to partially overlap the inclined surface.

As described above, in the multilayer electronic component according to the present invention, the plurality of internal electrode layers are superimposed in the dielectric substrate at intervals, and the step absorption layers are provided on lateral sides of the internal electrode layers. Therefore, the multilayer electronic component can obtain a basic configuration which absorbs a step generated due to the internal electrode layer.

In the present invention, a side portion of at least one internal electrode layer forms an inclined surface. Moreover, at least one step absorption layer is superimposed to partially overlap the inclined surface. According to this configuration, even if pattern misalignment such as displacement or expansion/contraction is generated in a print pattern of the step absorption layer, a margin quantity for the pattern misalignment is assured. Therefore, it is possible to readily prevent the step absorption layer from getting onto the upper surface of the internal electrode layer or a gap from being generated between the step absorption layer and the internal electrode layer.

In a preferred aspect, an overlap dimension of the step absorption layer with respect to the inclined surface is less than 60 μm as seen in a plan view. According to this overlap dimension, delamination can be avoided.

<Manufacturing Method of Multilayer Electronic Component>

In a manufacturing method of a multilayer electronic component according to the present invention, an internal electrode layer is formed on a dielectric green sheet in such a manner that a side portion thereof forms an inclined surface.

Additionally, a step absorption layer is superimposed and formed on the dielectric green sheet in such a manner that an end portion thereof partially overlaps the inclined surface.

Further, there is configured a sheet laminated body including at least one of the dielectric green sheets having the internal electrode layers and the step absorption layers formed thereon.

As described above, according to the manufacturing method of a multilayer electronic component of the present invention, the internal electrode layer is formed on the dielectric green sheet in such a manner that the side portion thereof forms the inclined surface. Furthermore, the step absorption layer is superimposed and formed on the dielectric green sheet in such a manner that the end portion thereof partially overlaps the inclined surface. According to this configuration, even if pattern misalignment such as displacement or expansion/contraction is generated in a print pattern of the step absorption layer, a margin quantity for the pattern alignment is assured. Therefore, it is possible to readily prevent the step absorption layer from getting onto the upper surface of the internal electrode layer or a gap from being generated between the step absorption layer and the internal electrode layer.

Moreover, there is configured the sheet laminated body including at least one of the dielectric green sheets having the internal electrode layers and the step absorption layers formed thereon. Therefore, a basic configuration of the multilayer electronic component according to the present invention can be obtained.

In a preferred aspect, when forming the step absorption layer on the dielectric green sheet, a pattern of the step absorption layer is prepared with a dimension which allows the end portion of the step absorption layer to be positioned at the center of the inclined surface of the internal electrode layer. Additionally, the step absorption layer is provided on the dielectric green sheet in such a manner that the end portion of the step absorption layer is positioned at the center of the inclined surface.

As described above, according to the present invention, there can be provided the multilayer electronic component and the manufacturing method thereof which can readily prevent the step absorption layer from getting onto the upper surface of the internal electrode or a gap from being generated between the step absorption layer and the internal electrode.

DESCRIPTION OF THE PREFERRED EMBODIMENTS

<Multilayer Electronic Component>

Figure 1:
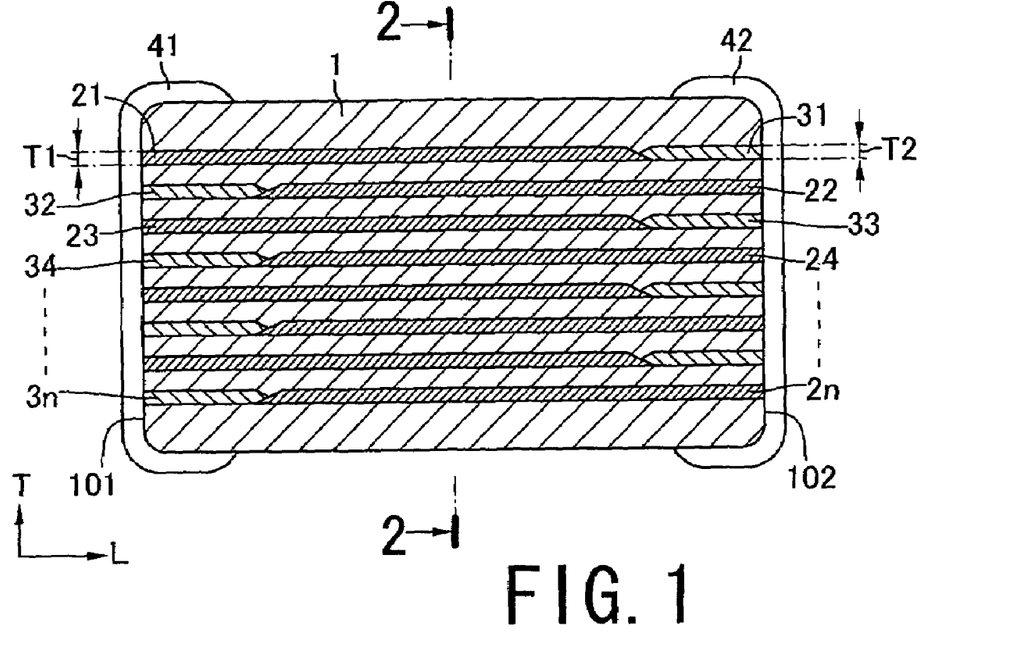
FIG. 1 is a cross-sectional view showing an embodiment of a multilayer electronic component according to the present invention.
Figure 2:
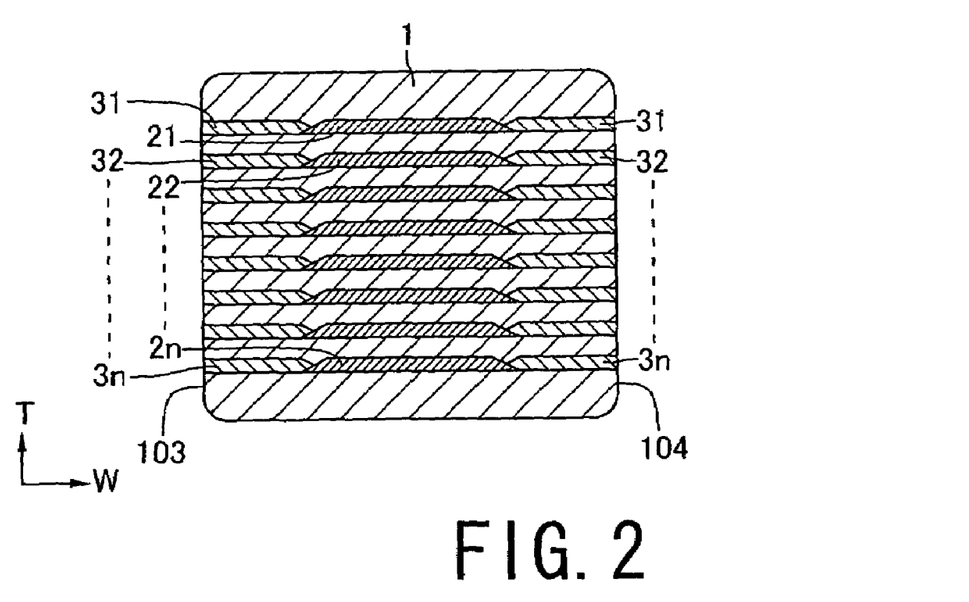
FIG. 2 is an end elevational view taken along a line 2-2 in FIG. 1.

FIG. 1 is a cross-sectional view showing an embodiment of a multilayer electronic component according to the present invention, and FIG. 2 is an end elevational view taken along a line 2-2 in FIG. 1. An illustrated multilayer electronic component includes a dielectric substrate 1 and n internal electrode layers 21 to 2n. In the illustrated embodiment, the present invention is applied to a multilayer ceramic capacitor, but it can be likewise applied to any other multilayer electronic component such as a multilayer inductor.

The dielectric substrate 1 is formed of a dielectric material mainly containing, e.g., barium titanate. The dielectric substrate 1 has a substantially rectangular parallelepiped shape having a length direction L, a width direction W and a thickness direction T, and terminal electrodes 41 and 42 are provided on both end faces 101 and 102 as seen from the length direction L. Each of the terminal electrodes 41 and 42 can be constituted of a multilayer structure consisting of an outer layer mainly containing, e.g., Sn, an intermediate layer mainly containing, e.g., Ni and an underlying layer mainly containing, e.g., Cu.

The internal electrode layers 21 to 2n are superimposed in the dielectric substrate 1 at intervals in the thickness direction T. The internal electrode layers 22 to 2n are superimposed with dielectric layers held therebetween. Each of the internal electrode layers 21 to 2n has a rectangular shape having the length direction L and the width direction W as seen in a plan view.

For example, in the internal electrode layer 21, one side end seen from the length direction L is led to the end face 101 of the dielectric substrate 1 to be connected with the terminal electrode 41, and the other side end seen from the length direction L is distanced from another end face 102 of the dielectric substrate 1 in the length direction L (see FIG. 1). Further, both the side ends seen from the width direction W are distanced from both side surfaces 103 and 104 of the dielectric substrate 1 in the width direction W (see FIG. 2).

This is also applied to the other internal electrodes 22 to 2n. The internal electrode layers 21 to 2n are alternately led to the end faces 101 to 102 of the dielectric substrate 1 to be connected with the terminal electrodes 41 and 42. The internal electrode layers 21 to 2n are formed of, e.g., Ni or Cu. A layer thickness T1 of each of the internal electrode layers 21 to 2n is, e.g., 1 µm, and the number of layers n is, e.g., 800. Furthermore, a layer thickness of the dielectric layer between the adjacent internal electrode layers is, e.g., 1 µm.

Moreover, step absorption layers 31 to 3n are provided on lateral sides of the internal electrode layers 21 to 2n. The step absorption layers 31 to 3n are respectively the same layers as the internal electrode layers 21 to 2n, and provided around the internal electrode layers.

For example, the step absorption layer 31 is provided in a region between the other side end of the internal electrode layer 21 and the end face 102 of the dielectric substrate 1 as seen from the length direction L and a region between both side ends of the internal electrode layer 21 and both side surfaces 103 and 104 of the dielectric substrate 1 as seen from the width direction W.

This is also applied to the other step absorption layers 32 to 3n. Each of the step absorption layers 31 to 3n is basically formed of the same material as that forming the dielectric substrate 1, and formed of, e.g., a dielectric material mainly containing barium titanate. A layer thickness T2 of each of the step absorption layers 31 to 3n is, e.g., 1 µm.

The basic configurations of the internal electrode layers 21 to 2n and the step absorption layers 31 to 3n are as described above. The detailed configurations will now be described while taking the internal electrode 21 and the step absorption layer 31 as an example.

Figure 3:
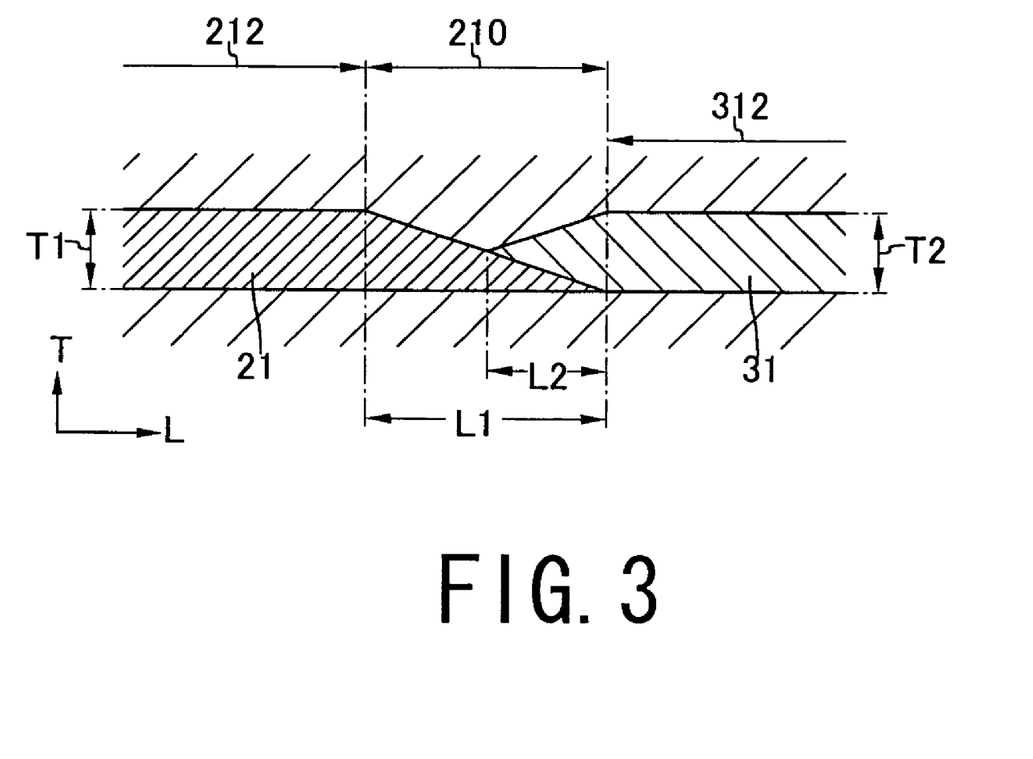
FIG. 3 is a partially enlarged view of an internal electrode layer and a step absorption layer in regard to the cross section depicted in FIG. 1.

FIG. 3 is a partially enlarged view of the internal electrode layer 21 and the step absorption layer 31 in regard to the cross section depicted in FIG. 1. However, a dimension in the thickness direction T is exaggerated for clarifying the drawings including the above described figures. Referring to FIGS. 1 and 3, the internal electrode layer 21 has a substantially flat upper surface 212 as seen from the thickness direction T. The step absorption layer 31 also has a substantially flat surface 312 as seen from the thickness direction T.

In the internal electrode layer 21, the other side end (the side end on the step absorption layer 31 side) of the internal electrode layer 21 forms an inclined surface 210 as seen from the length direction L. The inclined surface 210 is continuous with the upper surface 212, and has such an inclination as a lower surface side is closer to the step absorption layer 31 than an upper surface side. The inclined surface 210 is determined based on the layer thickness T1 of the internal electrode layer 21 and an inclined surface dimension L1 seen from the length direction L. The layer thickness T1 of the internal electrode layer 21 is as described above, and the inclined surface dimension L1 is, e.g., 100 μm The step absorption layer 31 is superimposed so as to partially overlap the inclined surface 210 of the internal electrode layer 21. Giving a detailed explanation, a side end of the step absorption layer 31 on the internal electrode layer 21 side overlaps the inclined surface 210 of the internal electrode layer 21 as seen from the thickness direction T. An overlap dimension L2 of the absorption step layer 31 seen from the length direction L is preferably set to be less than 60 μm or, preferably, set to 30 μm to 50 μm. Moreover, it is preferable for the step absorption layer 31 to be formed in such a manner that the upper surface 312 is placed at the same thickness position as the upper surface 212 of the internal electrode layer 21 as seen from the thickness direction T.

Additionally, referring to FIG. 2, both side ends of the internal electrode layer 21 seen from the width direction W also form inclined surfaces, and the step absorption layer 31 is also superimposed to partially overlap these inclined surfaces. This point is the same as the configuration shown in FIG. 3, thereby eliminating the tautological explanation.

Although the above has described the internal electrode layer 21 and the step absorption layer 31, this is also applied to the other internal electrode layers 22 to 2n and step absorption layers 32 to 3n, thus eliminating the tautological explanation.

As described above with reference to FIGS. 1 and 2, the internal electrode layers 21 to 2n are superimposed in the dielectric substrate 1 at intervals in the multilayer electronic component according to the present invention. Further, the step absorption layers 31 to 3n are respectively provided on the lateral sides of the internal electrode layers 21 to 2n. Therefore, the multilayer electronic component can obtain the basic configuration which absorbs steps generated due to the internal electrode layers 21 to 2n.

Furthermore, as described above with reference to FIG. 3, the side end of the internal electrode layer 21 on the step absorption layer 31 side forms the inclined surface 210. Moreover, the step absorption layer 31 is superimposed to partially overlap the inclined surface 210. According to this configuration, even if pattern misalignment such as displacement or expansion/contraction is generated in a print pattern of the step absorption layer 31, a margin quantity for the pattern misalignment is assured. Therefore, it is possible to readily prevent the step absorption layer 31 from getting onto the upper surface 212 of the internal electrode layer 21 or a gap from being generated between the step absorption layer 31 and the internal electrode layer 21. This is also applied to the other internal electrode layers 22 to 2n and step absorption layers 32 to 3n.

Although the illustrated embodiment has the configuration in which each of the internal electrode layers 21 to 2n has the inclined surface and each of the step absorption layers 32 to 3n partially overlaps the inclined surface of each of the internal electrode layers 21 to 2n, the present invention is not restricted such a configuration. The number of the internal electrode layers each having the inclined surface and the number of the step absorption layers each partially overlapping the inclined surface are arbitrary. This point will be obvious from the fact that the same functions and effects of the internal electrode layer and the step absorption layer can be obtained even in a configuration having only one internal electrode layer having an inclined surface and only one step absorption layer partially overlapping the inclined surface.

Additionally, it is preferable that the overlap dimension L2 of the step absorption layer with respect to the inclined surface is set to be less than 60 μm. This point will now be described with reference to experimental data.

The following Table 1 shows an evaluation of characteristics when the overlap dimension L2 is changed with respect to a multilayer ceramic capacitor having the configuration depicted in FIGS. 1 to 3. However, a minus sign (−) of the overlap dimension L2 means that the internal electrode layer is separated from the step absorption layer. Further, Table 1 also shows reference characteristics of the multilayer ceramic capacitor.

TABLE 1

| Overlap dimension L2 (μm) | Presence/ absence of void | Moisture-resistant load test (hour) | Presence/ absence of delamination | Capacitance (%) | Dimension in thickness direction (%) |
|---|---|---|---|---|---|
| Reference characteristics | Absent | 1000 or more | Absent | 95-105 | 95-105 |
| −30 | Present | 200 | Absent | 102 | 98 |
| −5 | Present | 700 | Absent | 101 | 99 |
| 5 | Absent | 2000 | Absent | 100 | 100 |
| 10 | Absent | 2500 | Absent | 99 | 100 |
| 30 | Absent | 2600 | Absent | 99 | 100 |
| 50 | Absent | 2400 | Absent | 98 | 101 |
| 55 | Absent | 1500 | Absent | 97 | 102 |
| 60 | Absent | 300 | Present | 95 | 105 |
| 70 | Absent | 250 | Present | 93 | 107 |
| 90 | Absent | 200 | Present | 91 | 109 |

Furthermore, data other than the overlap dimension L2 is as follows.

The number n of the internal electrode layers: 800

The layer thickness T1 of the internal electrode layer: 1 μm

The inclined surface dimension L1 of the internal electrode layer: 100 μm

The layer thickness T2 of the step absorption layer: 1 μm

The layer thickness of the dielectric layer as seem from a part between adjacent internal electrode layers: 1 μm A target value of a capacitance: 100 μF A target value of a dimension in the thickness direction: 1.60 mm The experimental data will now be examined. As shown in Table 1, when the overlap dimension L2 is set to 60 μm or above, a moisture-resistant time of the moisture-resistant load test becomes 300 hours or below and does not satisfy a reference (a moisture-resistant time: 1000 hours or above). However, when the overlap dimension L2 is set to 0 μm or above and less than 60 μm, the moisture-resistant time becomes 1500 hours or above, which satisfies the reference.

Furthermore, delamination occurs when the overlap dimension L2 is set to 60 μm or above, but delamination does not occur when the overlap dimension L2 is set to be less than 60 μm.

Therefore, it is preferable to set the overlap dimension L2 to be less than 60 μm. When the overlap dimension L2 is set to be less than 60 μm, the references of both the capacitance and the dimension in the thickness direction (the capacitance: 95% to 105%, the dimension in the thickness direction: 95% to 105%) are satisfied.

<Manufacturing Method of Multilayer Electronic Component>

A manufacturing method of a multilayer electronic component according to the present invention will be described. This embodiment concerns a manufacturing method of the multilayer electronic component depicted in FIGS. 1 to 3.

Figure 4:
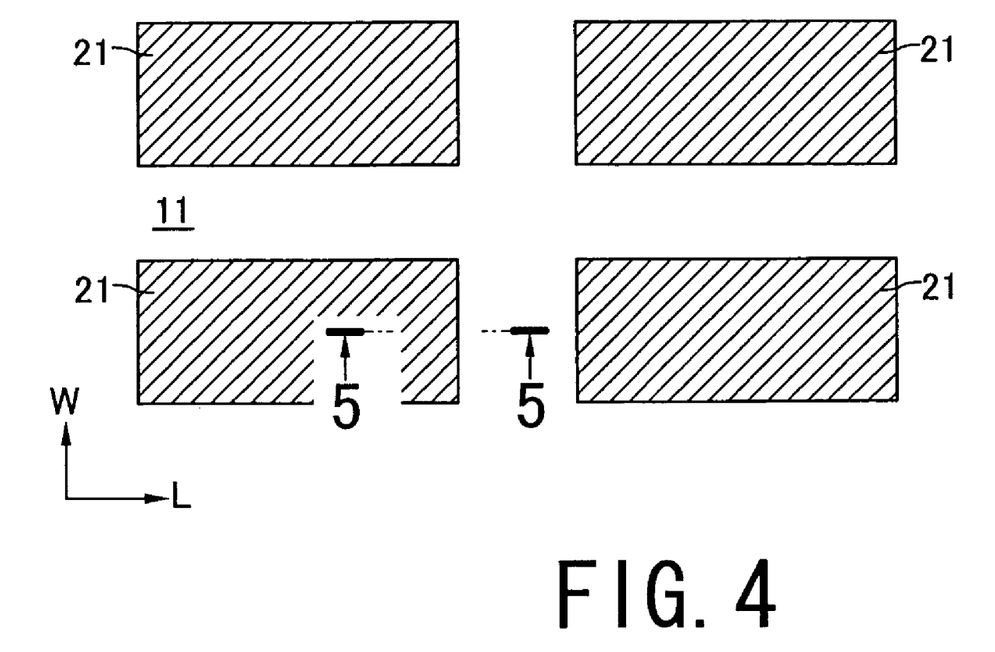
FIG. 4 is a view showing a step included in an embodiment of a manufacturing method of a multilayer electronic component according to the present invention.
Figure 5:
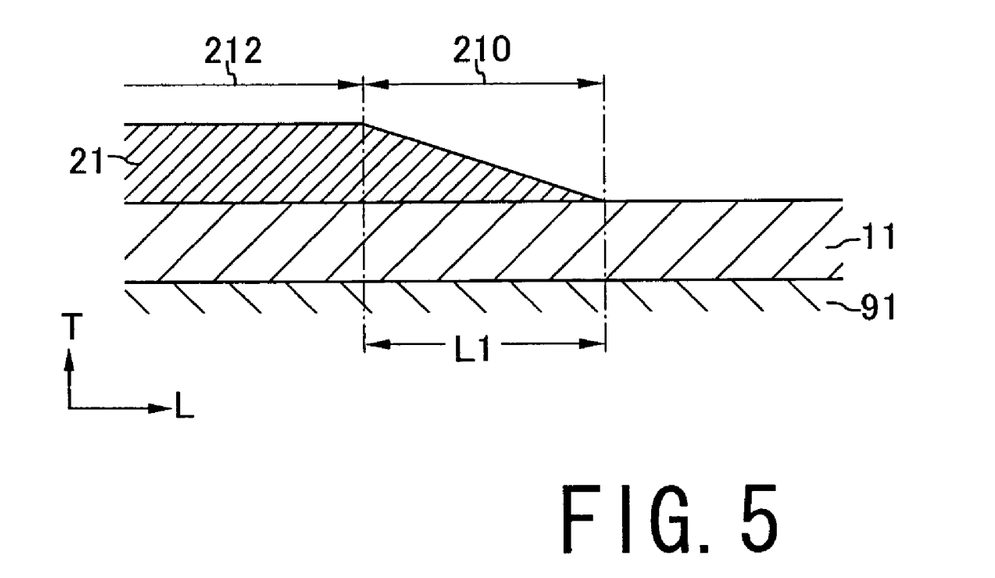
FIG. 5 is a partially enlarged cross-sectional view taken along a line 5-5 in FIG. 4.

FIG. 4 is a view showing a step included in an embodiment of the manufacturing method of the multilayer electronic component according to the present invention, and FIG. 5 is a partially enlarged cross-sectional view taken along a line 5-5 in FIG. 4. Referring to FIGS. 4 and 5, a dielectric green sheet (an unbaked dielectric sheet) 11 is attached on one surface of a support 91. The dielectric green sheet 11 is formed of a dielectric paste in which a dielectric powder, a solvent, a binder and others are mixed, and has a fixed thickness. Furthermore, the support 91 is formed of an appropriate flexible plastic film.

Next, an internal electrode layer 21 is formed on the dielectric green sheet 11 as shown in FIGS. 4 and 5. The internal electrode layer 21 is formed in such a manner that a side end forms an inclined surface 210. The inclined surface 210 is continuous with a substantially flat upper surface 212 as seen from a thickness T direction, and inclined in such a manner that a lower surface side extends toward the outside as compared with an upper surface side. Such an internal electrode layer 21 is formed by printing a conductor paste having a conductor powder, a solvent, a binder and others mixed therein in a predetermined pattern. The inclined surface 210 is formed by utilizing a running phenomenon of the conductor paste. As a printing technique, there is a screen printing method, a gravure printing method, an offset printing method or the like. A layer thickness T1 of the internal electrode layer 21 and an inclined surface dimension L1 seen from a length direction L are as described above.

In the illustrated embodiment, the internal electrode layer 21 is formed to have a rectangular shape having the length direction L and a width direction W as seen from a plan view. Therefore, not only one side end of the internal electrode layer 21 seen from the length direction L forms the inclined surface 210 (see FIG. 5), but also the other side end seen from the length direction L and both side ends seen from the width direction W form the same inclined surfaces.

Figure 6:
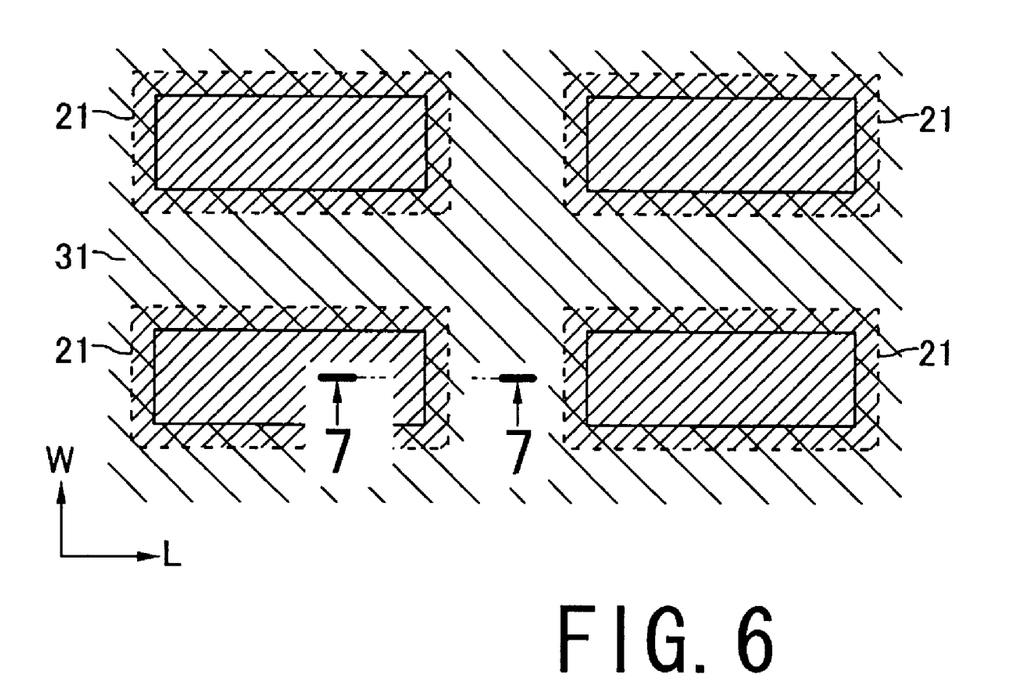
FIG. 6 is a view showing a step after the steps depicted in FIGS. 4 and 5.
Figure 7:
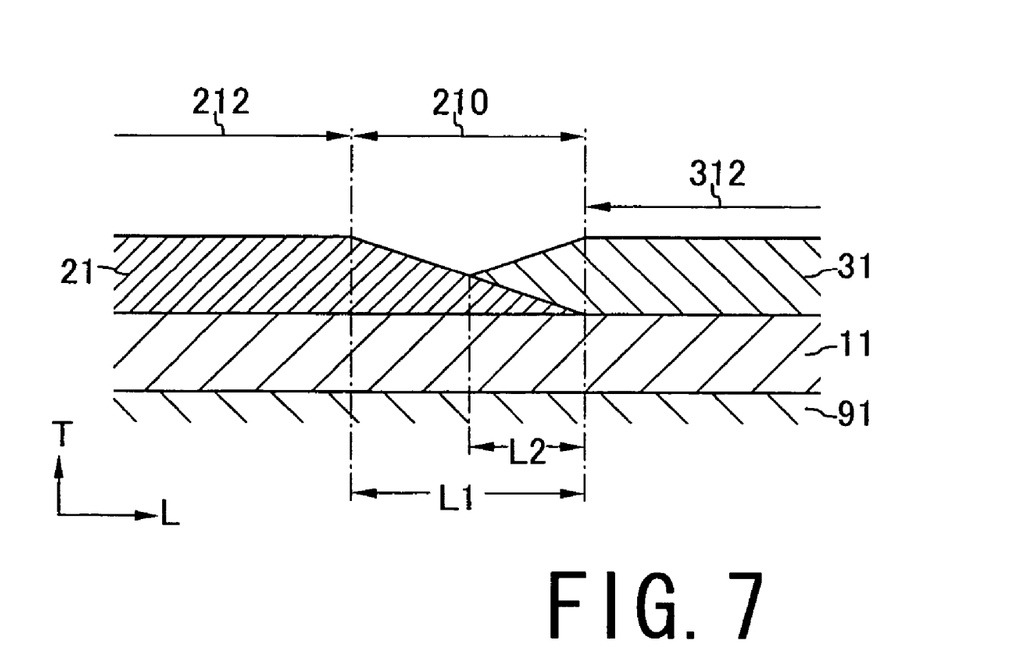
FIG. 7 is a partially enlarged cross-sectional view taken along a line 7-7 in FIG. 6.

Subsequently, as shown in FIGS. 6 and 7, a step absorption layer 31 is formed on the dielectric green sheet 11. The step absorption layer 31 is formed and superimposed in such a manner that an end portion thereof on the internal electrode layer 21 side partially overlaps the inclined surface 210 of the internal electrode layer 21 as seen from the width direction T. Such a step absorption layer 31 is formed by printing the dielectric paste in a predetermined pattern. In case of printing of the step absorption layer 31, it is preferable to position the end portion of the step absorption layer 31 at the center of the inclined surface 210 of the internal electrode layer 21 and then perform printing. The center of the inclined surface 210 means the center as seen from the inclined surface dimension L1 in the length direction L. As a printing method, there is a screen printing method, a gravure printing method, an offset printing method or the like. A layer thickness T2 of the step absorption layer 31 and an overlap dimension L2 as seen from the length direction L are as described above. It is to be noted that the overlap dimension L2 of the step absorption layer 31 may be 0 μm within a range of a printing error.

In the illustrated embodiment, the step absorption layer 31 is superimposed and formed to not only partially overlap the inclined surface 210 formed at one side end of the internal electrode layer 21 seen from the length direction L (see FIG. 7) but also likewise partially overlap the inclined surfaces formed at the other side end seen from the length direction L and both the side ends seen in the width direction W.

Further, it is preferable for the step absorption layer 31 to be formed in such a manner that the upper surface 312 thereof is placed at the same thickness position as the upper surface 212 of the internal electrode layer 21 as seen from the thickness direction T.

Figure 8:
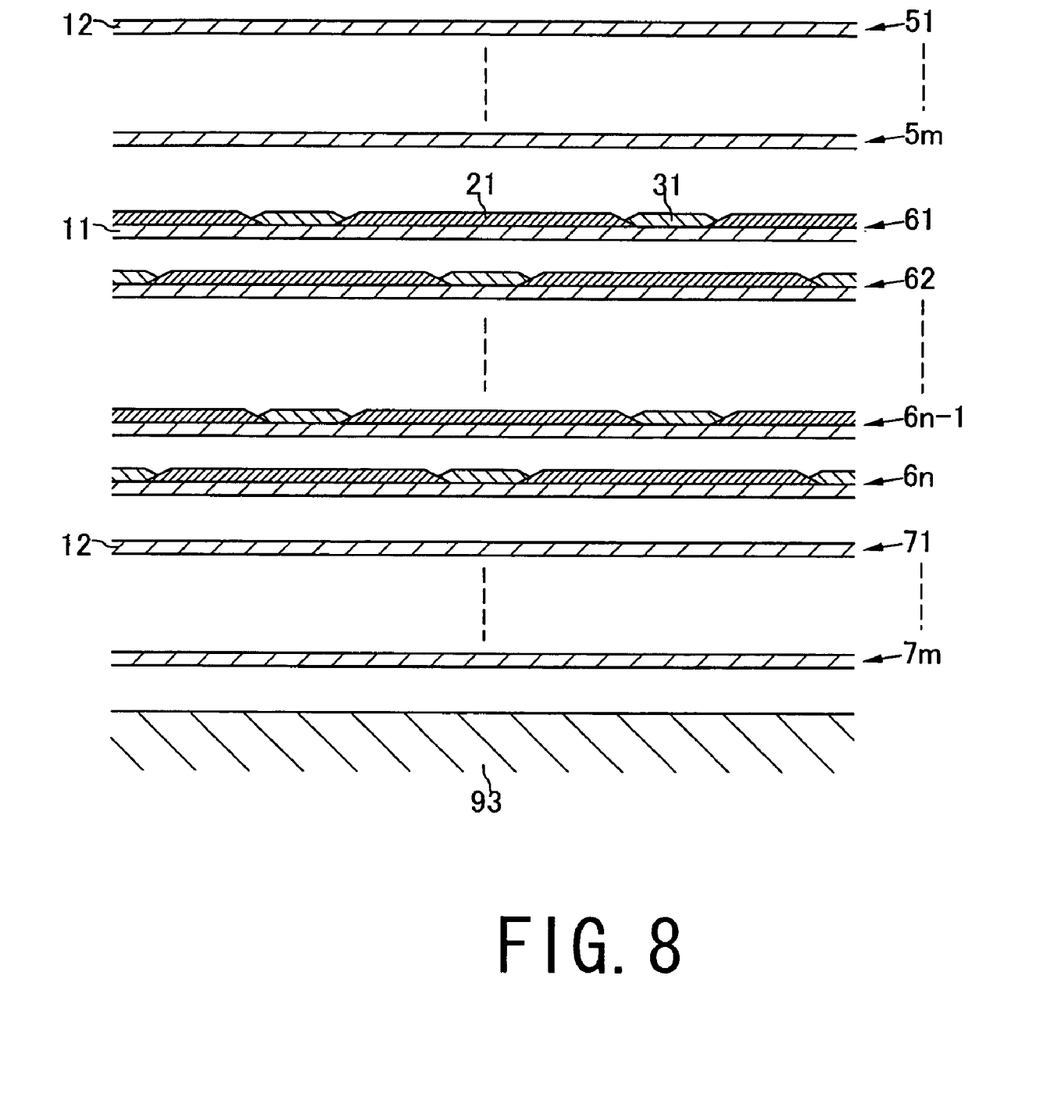
FIG. 8 is a view showing a step after the steps depicted in FIGS. 6 and 7.

Next, as shown in FIG. 8, a sheet laminated body including the dielectric green sheet 11 having the internal electrode layer 21 and the step absorption layer 31 formed thereon is constituted. In detail, the sheet laminated body is constituted with the dielectric green sheet 11 having the internal electrode layer 21 and the step absorption layer 31 formed thereon being determines as each of unit sheets 61 to 6n. In more detail, the sheet laminated body is configured in such a manner that positions of the unit sheets 61 to 6n are alternately shifted as seen from the length direction L. In the illustrated embodiment, the sheet laminated body is configured with a dielectric green sheet 12 which does not include the internal electrode layer or the step absorption layer being determined as each of outer layer unit sheets 51 to 5m and 71 to 7n in addition to the unit sheets 61 to 6n, for example.

In the illustrated embodiment, although a technique of laminating the outer layer unit sheets 51 to 5m, the unit sheets 61 to 6n and the outer layer unit sheets 71 to 7n on a lamination base 93 is adopted as a technique of constituting the sheet laminated body, the present invention is not restricted thereto. For example, it is possible to adopt a technique which repeats a dielectric green sheet forming step or a printing step of the internal electrode layer and the step absorption layer on the flexible support for the necessary number of times.

When a pressure is applied to the thus obtained sheet laminated body and then the sheet laminated body is cut into a one-chip region, a laminated green chip is obtained. Moreover, when steps such as removal of the binder, baking, formation of a terminal electrode and others are carried out, the multilayer electronic component shown in FIGS. 1 to 3 can be obtained.

In the manufacturing method of the multilayer electronic component according to the present invention, as shown in FIGS. 4 and 5, the internal electrode layer 21 is formed on the dielectric green sheet 11 in such a manner that a side portion thereof forms the inclined surface 210. Additionally, as shown in FIGS. 6 and 7, the step absorption layer 31 is superimposed and formed on the dielectric green sheet 11 in such a manner that the end portion thereof partially overlaps the inclined surface 210 of the internal electrode 21. According to this configuration, even if pattern misalignment such as displacement or expansion/contraction is generated in the print pattern of the step absorption layer 31, a margin quantity for the pattern misalignment is assured. Therefore, it is possible to readily prevent the step absorption layer 31 from getting onto the upper surface 210 of the internal electrode layer 21 or a gap from being generated between the step absorption layer 31 and the internal electrode layer 21.

Further, as shown in FIG. 8, the sheet laminated body including the dielectric green sheet 11 having the internal electrode layer 21 and the step absorption layer 31 formed thereon is configured. Therefore, the above described basic configuration of the multilayer electronic component according to the present invention can be obtained.

Although the process of forming the internal electrode layer 21 and then forming the step absorption layer 31 is adopted in the illustrated embodiment, the present invention is not restricted to this process. This point will become apparent from the fact that the basic configurations of the internal electrode layer having the inclined surface and the step absorption layer superimposed so as to partially overlap the inclined surface can be obtained even if a process of forming the step absorption layer and then forming the internal electrode layer is adopted, for example.

What is claimed is:

1. A multilayer electronic component comprising:
   a dielectric substrate;
   a plurality of internal electrode layers superimposed in the dielectric substrate at intervals; and
   step absorption layers provided on lateral sides of the internal electrode layers,
   wherein a side portion of at least one internal electrode layer forms an inclined surface, and
   at least one step absorption layer is superimposed so as to partially overlap the inclined surface.

2. The multilayer electronic component according to claim 1, wherein an overlap dimension of the step absorption layer with respect to the inclined surface is less than 60 μm as seen in a plan view.

3. The multilayer electronic component according to claim 1, wherein the multilayer electronic component is a multilayer ceramic capacitor.

4. A manufacturing method of a multilayer electronic component, comprising:
   forming an internal electrode layer on a dielectric green sheet in such a manner that a side portion thereof forms an inclined surface;
   superimposing a step absorption layer on the dielectric green sheet in such a manner that an end portion thereof partially overlaps the inclined surface; and
   configuring a sheet laminated body including at least one of the dielectric green sheets having the internal electrode layer and the step absorption layer formed thereon.

5. The manufacturing method of a multilayer electronic component according to claim 4, wherein, when forming the step absorption layer on the dielectric green sheet,
   a pattern of the step absorption layer is prepared with a dimension which allows the end portion of the step absorption layer to be positioned at the center of the inclined surface of the internal electrode layer, and
   the step absorption layer is provided on the dielectric green sheet in such a manner that the end portion of the step absorption layer is placed at the center of the inclined surface.

6. The manufacturing method of a multilayer electronic component according to claim 4, wherein the manufacturing method of a multilayer electronic component is a manufacturing method of a multilayer ceramic capacitor.

* * * * *